May 2, 1939.  R. C. PIERCE  2,156,899
HOSE CONSTRUCTION
Filed Dec. 27, 1937   2 Sheets-Sheet 1
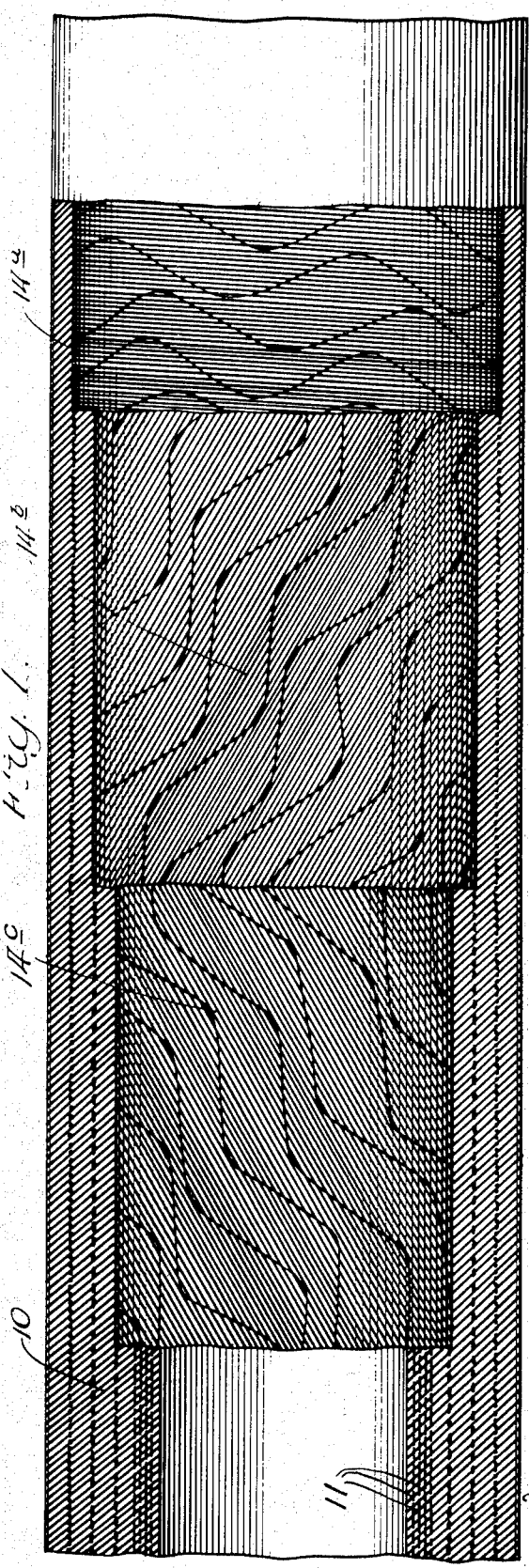
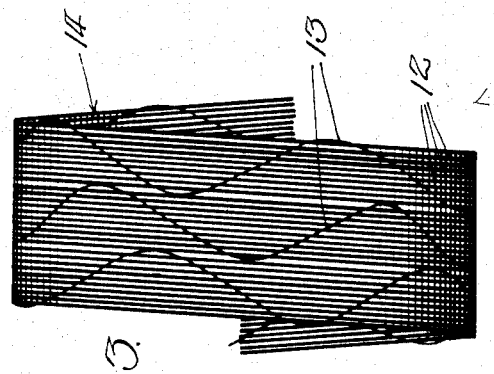
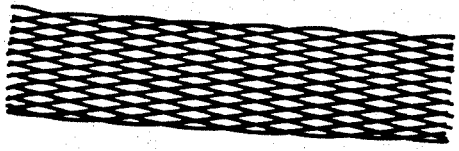
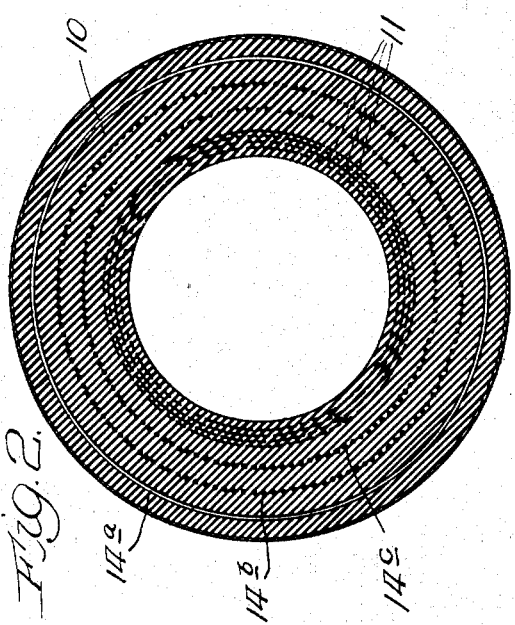
Inventor:
Robert C. Pierce, May 2, 1939.  R. C. PIERCE  2,156,899
HOSE CONSTRUCTION
Filed Dec. 27, 1937   2 Sheets-Sheet 2
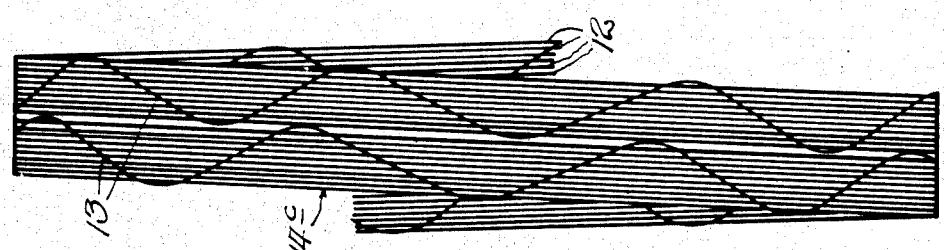
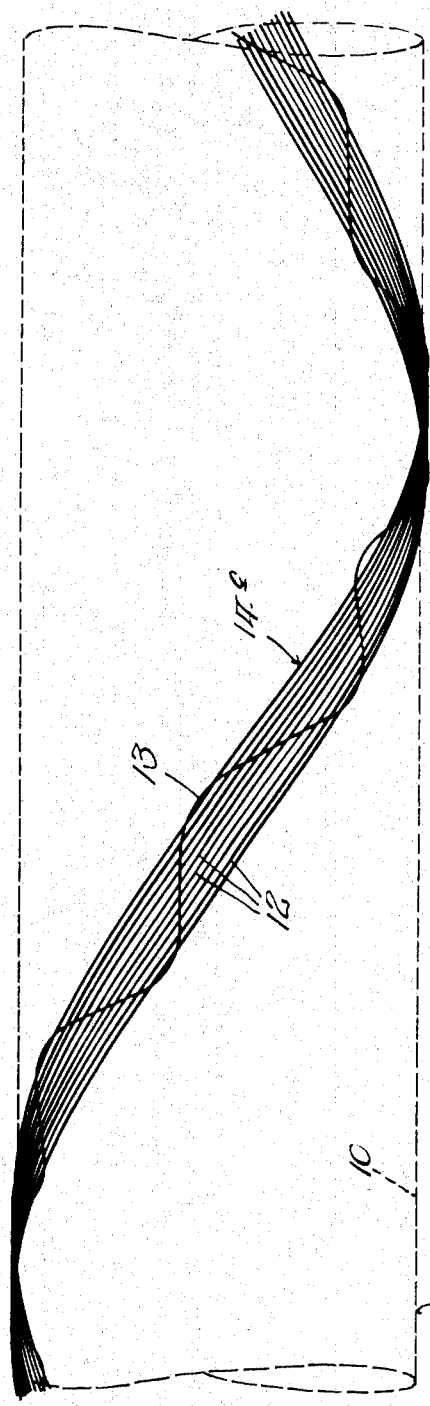
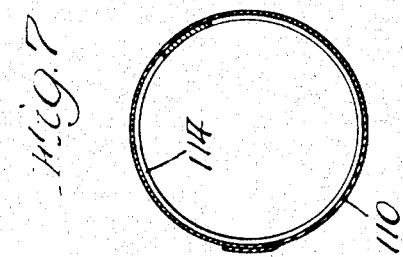
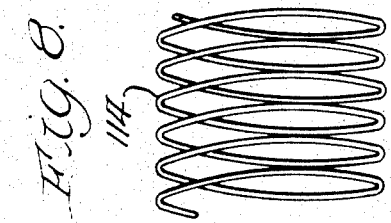
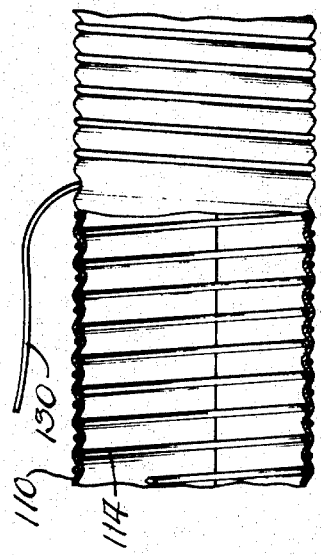
Inventor
Robert C. Pierce,
By Chritton, Wiles, Davies, Hirschl & Dawson
Attys.